Patented Aug. 19, 1924.

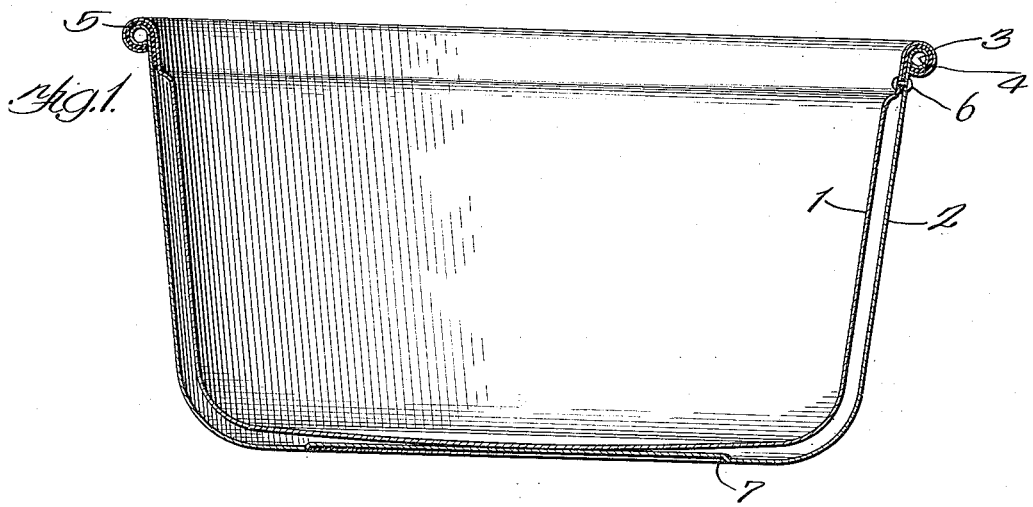
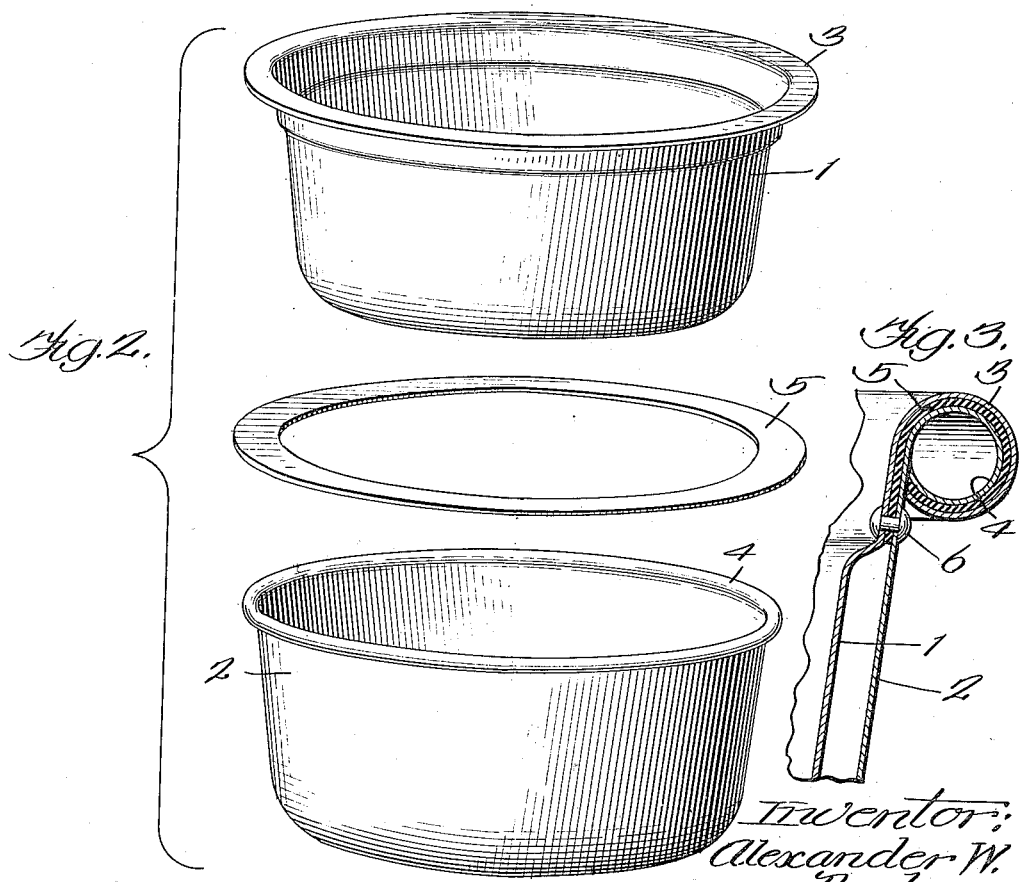

1,505,703

UNITED STATES PATENT OFFICE.

ALEXANDER WARD DARLEY, OF LARAMIE, WYOMING.

HEATING UTENSIL.

Application filed March 22, 1923. Serial No. 626,865.

*To all whom it may concern:*

Be it known that I, ALEXANDER WARD DARLEY, citizen of the United States, residing at Laramie, in the county of Albany and State of Wyoming, have invented a certain new and useful Improvement in Heating Utensils, of which the following is a full, clear, concise, and exact description.

My invention relates to heating utensils that employ wall portions and a heat transmitting medium between said portions. Such a utensil of the prior art is the well known double boiler employing two nested vessels with a space between their bottoms in which water is contained. These double boilers easily become inoperative, due to the ready evaporation of the water, it being necessary to afford escape for the steam to prevent bursting. Such utensils are practically limited to the treatment of their contents at water boiling temperature to the transmission of which the boiling water is practically limited, the advantage being that the contents cannot be burned so long as water is present between the nested vessels.

In practicing my invention I employ a medium which is not only capable of transmitting heat that approximates the temperature of boiling water, but also heat of much higher temperature so that the heating utensil need not be limited in its use to the heating of material at water boiling temperature. I select a heat transmitting medium which may be confined in the space between the wall portions of the heating utensil without being forced therefrom in the use of the utensil. The heat transmitting medium desirably flows in functioning and the space between the wall portions of the utensil which contains it is sealed fluid tight. I prefer to employ gas as the heat transmitting medium, the gas which is used being desirably air. A portion of the air may be withdrawn, while unexpanded, from its holding space, prior to the sealing of this space. The heating capacity of the utensil may be varied by varying the amount of unexpanded air that is left in its holding space. If preferred, the air may be expanded to the requisite degree and be received in sufficient quantity within its holding space, before this space is sealed, the expansion being accomplished either before or after the air is in its holding space. If the air is sufficiently expanded outside of the utensil, the space that receives it may be immediately sealed after its introduction, but if it is expanded while in place by subjecting the utensil to a degree of heat approximating that to which the utensil is to be submitted in its normal use, the excess escapes before the sealing operation. By following either of these methods, the utensil will not burst or become misshapen when it is employed for its intended purpose. The walls of the vessel are desirably formed to engage each other when the vessel is cold and to become separated under the influence of heat, whereby the vessel and its contents may be rapidly heated to a point not dangerous to the vessel contents. When this point is reached, separation of the walls is effected, by the pressure of the expanded fluid permitting the heat conducting medium to function as described.

When my invention is embraced in a heating utensil of the double boiler type the construction may be as illustrated in the accompanying drawing in which Fig. 1 is a vertical sectional view; Fig. 2 illustrates the elements of the structure of Fig. 1 in separated relation; and Fig. 3 is a sectional view, on a larger scale, of a part of the utensil.

Like parts are indicated by similar characters of reference throughout the different figures.

The inner vessel wall 1 and the outer vessel wall 2 are formed of metal or other suitable material and may be provided with curled rims 3' and 4 which are interlocked to maintain the vessel walls in assembly. The relative sizes of the two vessel walls are such that a space intervenes between portions of their bottom portions, this space desirably continuing between the sides of the vessel walls.

The heat transmitting medium is in the space between the vessel walls. This medium, being fluid in functioning, prevents the burning or scorching of the food or other matter upon or in connection with which the utensil is used. The medium which ideally fills all requirements is, as stated, a suitable gas such as air which ideally contacts with the walls in functioning.

After the space between the nested vessel walls of the utensil has become properly supplied with the heat transmitting medium such space is sealed fluid tight. This may, for example, be done by a gasket 5 that is disposed between the interlocked rims of the vessel walls and a rivet 6 whose shank fills a vent that is allowed to remain until the process of supplying the space between the vessel walls with the heat transmitting medium is completed. This gasket is preferably non-heat conducting.

The outside bottom wall of the utensil may be formed with a circular depression 7 in accordance with common practice. The inside bottom wall of the utensil is outwardly bulged and is constrained to contact with the outer bottom when the utensil is cold, for the purpose hitherto stated, this inner bottom moving out of contact with the outer bottom before the heat transmitted to the utensil interior reaches a predetermined degree, due to the pressure exerted by the heated medium and resulting from the heating of this medium to the predetermined degree. Other arrangements of the utensil walls may be employed to accomplish this result. The surface expansion of metal commonly used in cooking utensil manufacture is .009 over a range of heat from 32° to 570° F. Such negligible expansion need not be considered.

On the other hand air expands .002 of its volume for every degree F. so that the application of the 540° F. above mentioned would double its volume, and create considerable pressure; enough indeed to burst the vessel if the air were sealed in at atmospheric temperature; but if the air were sealed at 300° F. it would exert no pressure until heated beyond this point. If sealed at 300° F. it is impossible to apply sufficient heat to cause a pressure which will damage the vessel, because the radiation prevents the air heating in proportion to the heat applied and the vessel will melt before the expansion causes any damage.

My experiments have demonstrated that the pressure can be easily and accurately regulated by sealing at the required temperature.

As the heat passes the point at which the chamber was sealed the pressure gradually forces the air between the two bottoms and since the bottoms offer less resistance to the pressure than do the side walls it causes them to separate. This separation increases the volume of the chamber thus causing the increase of pressure to be slow, which fact aids in preventing a damaging pressure.

When the heat is withdrawn, the air pressure decreases and atmospheric pressure forces the bottoms into their original position.

The heating capacity of my utensils may be varied by sealing the vents therein at varying degrees of temperature, or, as stated, by varying the amount of unexpanded medium therein.

While the utensil herein shown is adapted to cooking, the invention is not to be limited to the shape or purpose of the illustrated embodiment thereof.

Having thus described my invention I claim as new and desire to secure by Letters Patent the following:—

1. A heating vessel including two portions having a space therebetween sealed fluid tight, and a heat transmitting gas in said space, said portions being arranged to contact over a certain area, when cold, and to separate at their place of contact when the vessel is heated.

2. A heating vessel including two portions having a space therebetween sealed fluid tight, and a heat transmitting expansible fluid in said space, said portions being arranged to contact over a certain area, when cold, and to separate at their places of contact when the vessel is heated.

3. A heating vessel including two portions having a space therebetween sealed fluid tight, and a heat transmitting expansible medium in said space, said portions being arranged to contact over a certain area, when cold, and to separate at their places of contact when the vessel is heated.

In witness whereof, I hereunto subscribe my name this 26th day of February A. D., 1923.

ALEXANDER WARD DARLEY.